US008416466B2

(12) United States Patent
Takata

(10) Patent No.: US 8,416,466 B2
(45) Date of Patent: Apr. 9, 2013

(54) IMAGE READING APPARATUS AND MARK DETECTION METHOD

(75) Inventor: Hiroaki Takata, Ishikawa (JP)

(73) Assignee: PFU Limited, Ishikawa (JP)

( * ) Notice: Subject to any disclaimer, the term of this patent is extended or adjusted under 35 U.S.C. 154(b) by 927 days.

(21) Appl. No.: 12/423,870

(22) Filed: Apr. 15, 2009

(65) Prior Publication Data

US 2009/0284806 A1 Nov. 19, 2009

(30) Foreign Application Priority Data

May 13, 2008 (JP) .................. 2008-125915

(51) Int. Cl.
H04N 1/387 (2006.01)

(52) U.S. Cl.
USPC .......... 358/453; 358/448; 358/3.28; 101/226; 382/187

(58) Field of Classification Search .................. 358/453, 358/448, 3.28; 101/226; 382/187
See application file for complete search history.

(56) References Cited

U.S. PATENT DOCUMENTS

| | | | | |
|---|---|---|---|---|
| 5,644,408 A * | 7/1997 | Li et al. | .......................... | 358/468 |
| 2002/0051262 A1 * | 5/2002 | Nuttall et al. | .................. | 358/537 |
| 2003/0142359 A1 * | 7/2003 | Bean et al. | ..................... | 358/3.28 |
| 2006/0294450 A1 * | 12/2006 | Barrus et al. | ................... | 715/500 |
| 2007/0144373 A1 * | 6/2007 | Okura et al. | ................... | 101/226 |
| 2008/0050019 A1 * | 2/2008 | Morohoshi | ................... | 382/187 |
| 2008/0079990 A1 | 4/2008 | Iida | | |

FOREIGN PATENT DOCUMENTS

| | | |
|---|---|---|
| JP | 10-111793 | 4/1998 |
| JP | 2002-368954 | 12/2002 |
| JP | 2004-023167 | 1/2004 |
| JP | 2004-228951 A | 8/2004 |
| JP | 2005-196637 | 7/2005 |
| JP | 2008-085820 | 4/2008 |

OTHER PUBLICATIONS

Japanese Decision to Grant for Application No. 2008-125915 mailed Oct. 16, 2012.

* cited by examiner

Primary Examiner — Twyler Haskins
Assistant Examiner — Michael Burleson
(74) Attorney, Agent, or Firm — Lowe Hauptman Ham & Berner LLP

(57) ABSTRACT

An image reading apparatus includes an image reader, a storage unit, and a control unit, wherein the storage unit includes a command storage unit, and the control unit includes a mark detecting unit that detects at least one mark matching the characteristic information of the mark from the margin of the manuscript read by the image reader to acquire the characteristic information of the detected mark, a positional information determining unit that detects coordinates of the mark in the manuscript to determine the positional information corresponding to the detected coordinates, a command searching unit that searches the command storage unit for the command associated with the characteristic information and the positional information using the characteristic information and the positional information as search keys, and a command executing unit that executes the processing specified for the command searched for on the manuscript.

10 Claims, 6 Drawing Sheets

FIG.9

COMMAND DICTIONARY TABLE 106a

CHARACTERISTIC OF SHAPE OF MARK →

| | | ∨ (Acute angle) | ∨ (Obtuse angle) | < (Acute angle) | < (Obtuse angle) | ↑ | ↑ |
|---|---|---|---|---|---|---|---|
| | | CLOCKWISE | CLOCKWISE | COUNTER-CLOCKWISE | COUNTER-CLOCKWISE | | |
| FRONT | UPPER RIGHT | PROCESSING A1 | | | | | |
| FRONT | UPPER LEFT | PROCESSING A2 | PROCESSING B1 | | | | |
| FRONT | LOWER RIGHT | PROCESSING A3 | PROCESSING B2 | PROCESSING C1 | | | |
| FRONT | LOWER LEFT | PROCESSING A4 | PROCESSING B3 | PROCESSING C2 | PROCESSING D1 | | |
| BACK | UPPER RIGHT | → | | | | | |
| BACK | UPPER LEFT | | → | | | | |
| BACK | LOWER RIGHT | | | → | | | |
| BACK | LOWER LEFT | | | | → | | |

POSITIONAL INFORMATION OF MARK

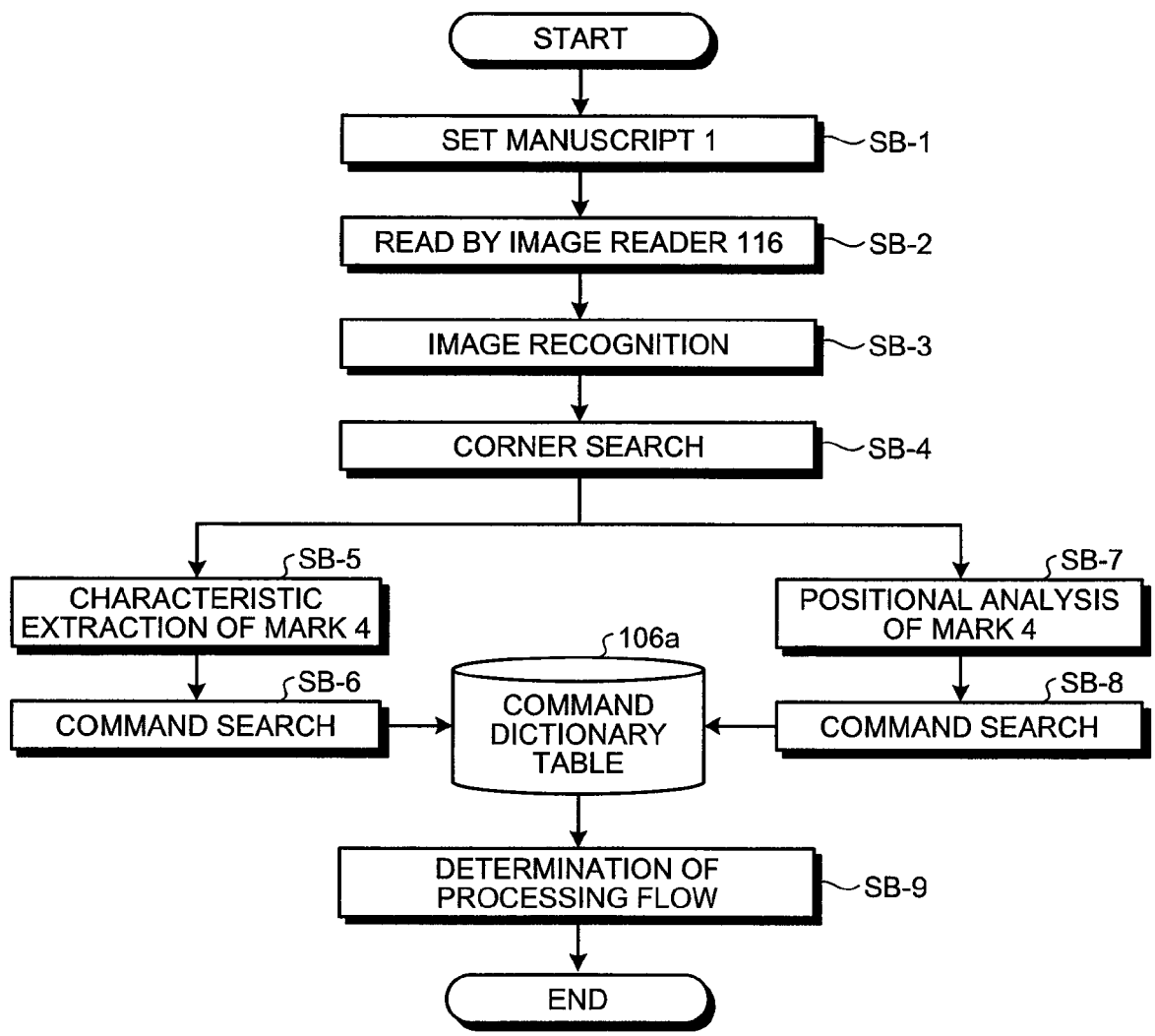

IMAGE READING APPARATUS AND MARK DETECTION METHOD

RELATED APPLICATIONS

The present application is based on, and claims priority from, Japan Application Number 2008-125915, filed May 13, 2008, the disclosure of which is hereby incorporated by reference herein in its entirety.

BACKGROUND OF THE INVENTION

1. Field of the Invention

The present invention relates to an image reading apparatus and a mark detection method.

2. Description of the Related Art

In an image reading apparatus such as a copier, scanner, printer, and facsimile, setting conditions and the like are conventionally input through an input unit each time a manuscript or the like is read. In recent years, however, development of an image reading apparatus enabling automatic input of setting conditions and the like when continuous reading processing of manuscripts and the like is performed is demanded.

According to a technology described in JP-A-2004-228951, for example, a margin is provided in a predetermined region of a manuscript or the like to be read and a processing selection is automatically made for the manuscript by a code written in the margin being recognized and read by an optical character reader (OCR) or the like.

However, a conventional image reading apparatus (such as one described in JP-A-2004-228951) has a problem of code recognition accuracy because the code for specifying setting conditions and the like is limited to a character form (for example, magnification 141%, 20 copies, and A3). The conventional image reading apparatus also has a problem of a long code reading time due to a heavy load of reading processing of code in character form. Further, the conventional image reading apparatus has a problem that a code cannot be written at any position in a margin of a manuscript in any form because a region where a code is written is limited to a region specified in advance and thus, it is necessary to use a manuscript in predetermined form.

SUMMARY OF THE INVENTION

It is an object of the present invention to at least partially solve the problems in the conventional technology.

A image reading apparatus according to one aspect of the present invention includes an image reader that reads a manuscript with a margin in at least a portion thereof, a storage unit, and a control unit, wherein the storage unit includes a command storage unit that associates and stores characteristic information of a predetermined mark shape written in at least a portion of the margin of the manuscript, positional information of the mark, and a command specifying processing on the manuscript and the control unit includes a mark detecting unit that detects at least one mark matching the characteristic information of the mark from the margin of the manuscript read by the image reader to acquire the characteristic information of the detected mark, a positional information determining unit that detects coordinates of the mark acquired by the mark detecting unit in the manuscript to determine the positional information corresponding to the detected coordinates, a command searching unit that searches the command storage unit for the command associated with the characteristic information acquired by the mark detecting unit and the positional information determined by the positional information determining unit using the characteristic information and the positional information as search keys, and a command executing unit that executes the processing specified for the command searched for by the command searching unit on the manuscript.

A mark detection method according to another aspect of the present invention is executed by the image reading apparatus including an image reader that reads a manuscript with a margin in at least a portion thereof, a storage unit, and a control unit, wherein the storage unit includes a command storage unit that associates and stores characteristic information of a predetermined mark shape written in at least a portion of the margin of the manuscript, positional information of the mark, and a command specifying processing on the manuscript and the method includes a mark detecting step of detecting at least one mark matching the characteristic information of the mark from the margin of the manuscript read by the image reader to acquire the characteristic information of the detected mark, a positional information determining step of detecting coordinates of the mark acquired at the mark detecting step in the manuscript to determine the positional information corresponding to the detected coordinates, a command searching step of searching the command storage unit for the command associated with the characteristic information acquired at the mark detecting step and the positional information determined at the positional information determining step using the characteristic information and the positional information as search keys, and a command executing step of executing the processing specified for the command searched for at the command searching step on the manuscript wherein, the steps are executed by the control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a chart showing one example of a configuration of a command dictionary table 106a according to the embodiment;

FIG. 10 is a flowchart showing details of a processing of the image reading apparatus 100 according to the embodiment.

DETAILED DESCRIPTION OF THE PREFERRED EMBODIMENTS

An embodiment of an image reading apparatus and a mark detection method and a program according to the present invention will be explained below in detail based on the drawings. The embodiment does not limit the invention.

Particularly in embodiments below, an example in which the present invention is applied when a scanner device for reading a manuscript or the like is used as an image reader of the present invention is explained, but the present invention is not limited to this and can be applied in the same manner when a digital camera, Web camera or the like capable of photographing, for example, a manuscript to be photographed is used as an image reader.

OVERVIEW OF THE INVENTION

Figure 1:
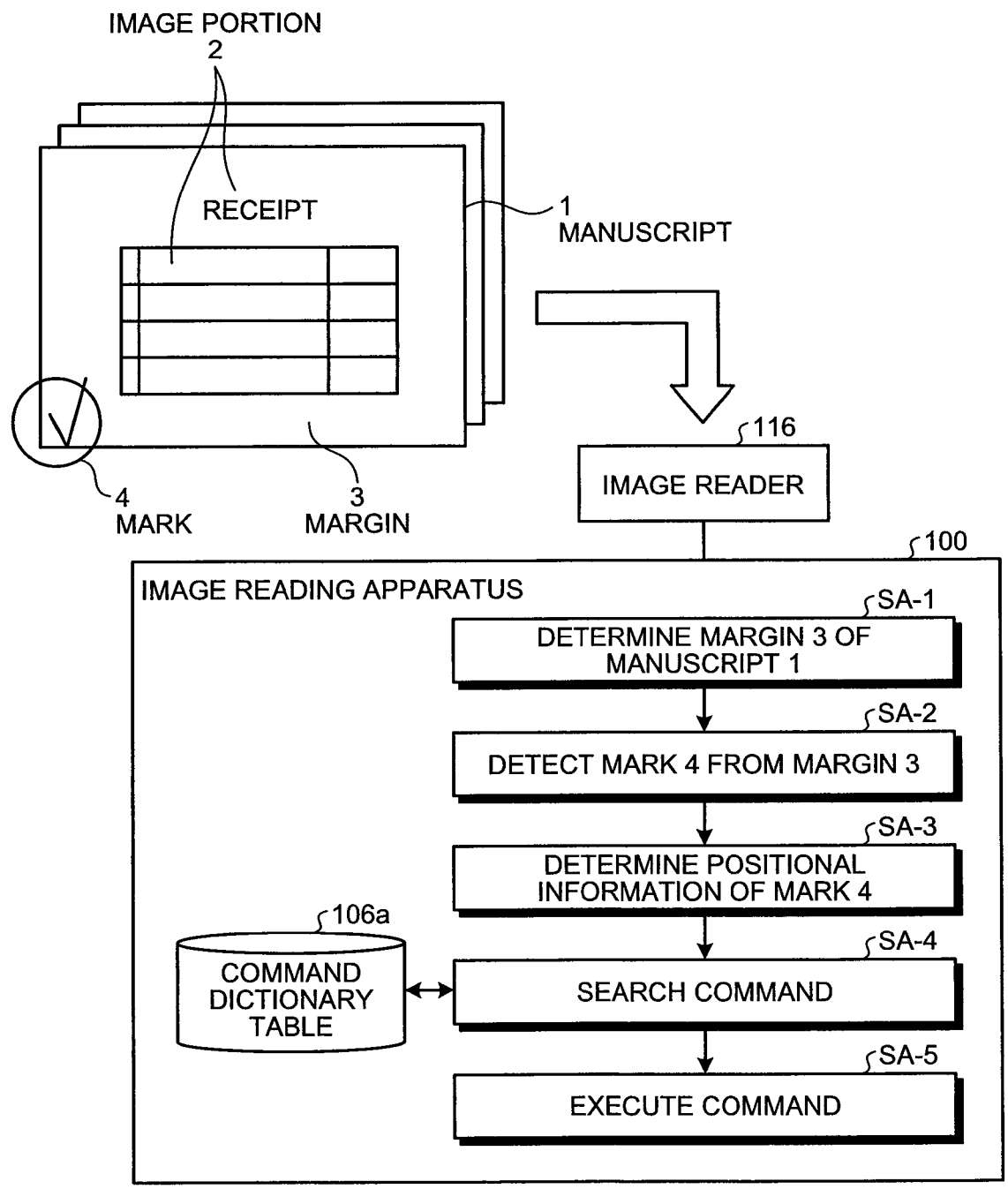
FIG. 1 is a view showing one example of a basic processing of the image reading apparatus 100 using a manuscript 1 applied to the invention.
Figure 2:
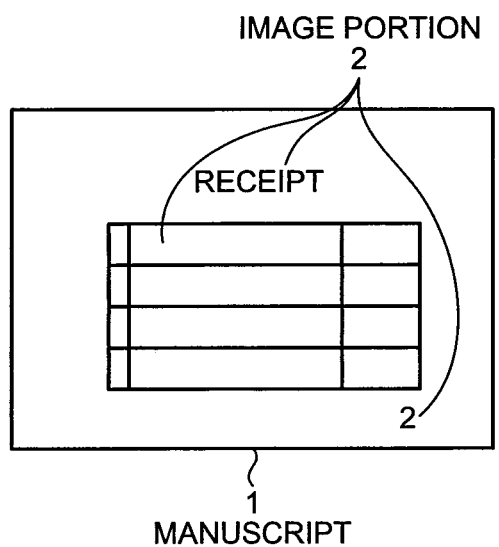
FIG. 2 is a view showing one example of a margin 3 of the manuscript 1.
Figure 3:
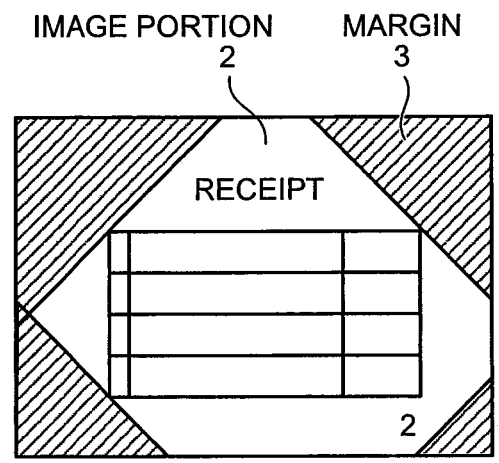
FIG. 3 is a view showing one example of the margin 3 of the manuscript 1.
Figure 4:
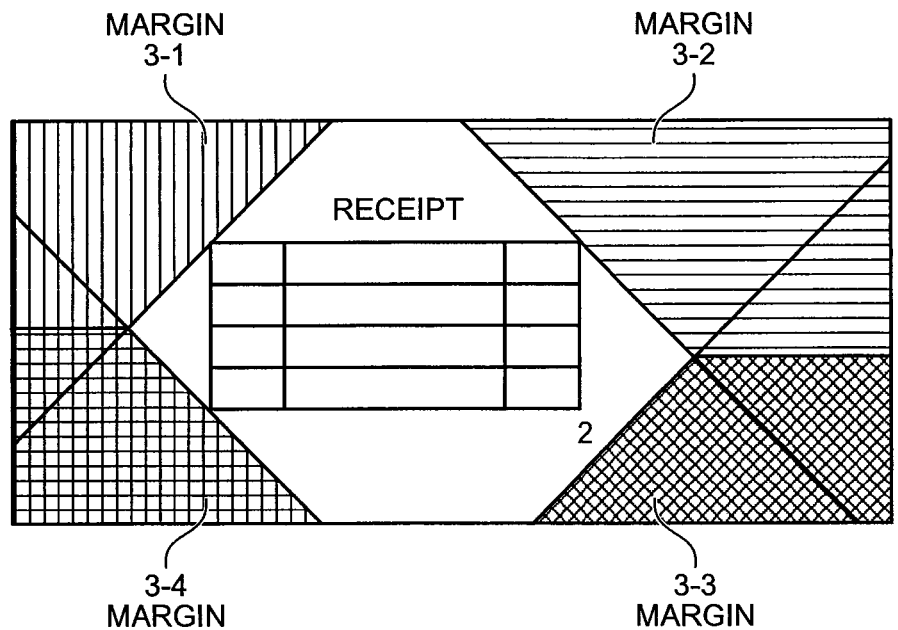
FIG. 4 is a view showing one example of the margin 3 of the manuscript 1.
Figure 5:
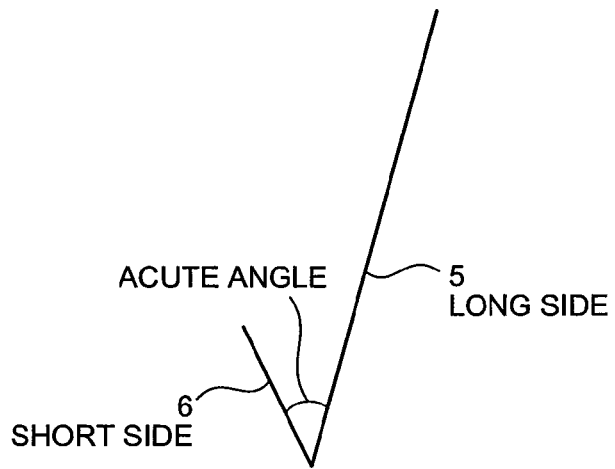
FIG. 5 is a view showing one example of a mark 4 written on the manuscript 1.
Figure 6:
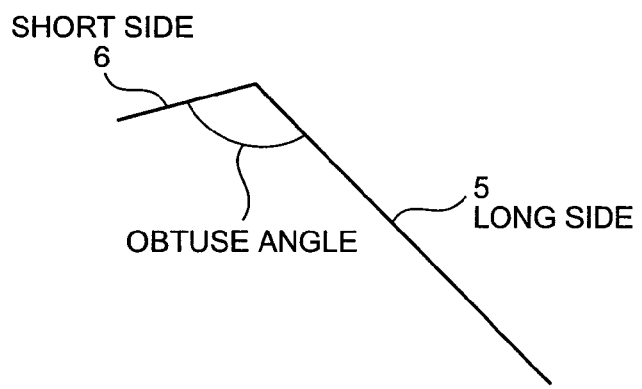
FIG. 6 is a view showing one example of the mark 4 written on the manuscript 1.
Figure 7:
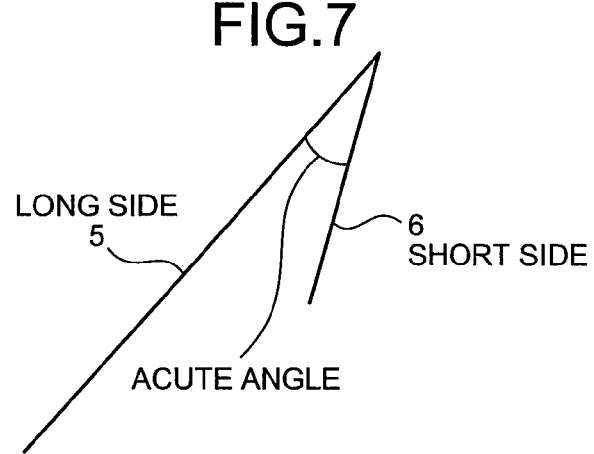
FIG. 7 is a view showing one example of the mark 4 written on the manuscript 1.

The following outlines the present invention with reference to FIGS. 1 to 7, and then, a configuration and processing of the present invention will be explained in detail. FIG. 1 is a view showing one example of a basic processing of the image reading apparatus 100 using a manuscript 1 applied to the invention. FIGS. 2 to 4 are views showing one example of a margin 3 of the manuscript 1. FIGS. 5 to 7 are views showing one example of a mark 4 written on the manuscript 1.

The invention has schematically following basic features.

First, as shown in FIG. 1, the present invention uses the manuscript 1 having the margin 3 in at least a portion thereof. In FIG. 1, for example, an example in which slips such as receipts are used as the manuscript 1 is used. Here, the manuscript 1 has the margin 3 in at least a portion around the perimeter of paper.

More specifically, in FIG. 1, for example, the manuscript 1 includes an image portion 2 containing a title (for example, "Receipt") and a content portion of the receipt and the margin 3 other than the image portion 2, and a predetermined mark 4 (for example, a check mark) specifying processing for the manuscript 1 is written at a lower left position of the margin 3 of the manuscript 1.

As shown in FIG. 1, the image reading apparatus 100 according to the present invention detects corners of the manuscript 1 read by an image reader 116 and searches a region from the detected corners to the image portion 2 of the manuscript 1 in a direction toward a center of the manuscript 1 to determine the margin 3 (step SA-1).

Here, a "manuscript" is used to mean the manuscript 1 with the margin 3 in at least a portion thereof and is, for example, a document such as a slip and photo read when a scanner or the like is used the image reader 116. If a digital camera, Web camera or the like is used as the image reader 116, the "manuscript" may not be plane such as a document, but may also be three-dimensional.

Here, an image reading apparatus 100 according to the present invention detects a boundary between the manuscript 1 and a background in an image including the manuscript 1 read by the image reader 116 and the background (not shown) and corners of the manuscript 1 may be detected by performing cropping processing, which cuts out the manuscript 1 from the background. Various conventional technologies can be used for cropping processing.

One example of the margin 3 of the manuscript 1 is explained below with reference to FIGS. 2 to 4.

As shown in FIG. 2, the manuscript 1 may include the image portion 2 including the title (for example, "Receipt"), a content portion of the receipt, and a memo (for example, "2") and the margin 3 other than the image portion 2.

When the margin 3 is determined from the manuscript 1 shown in FIG. 2, as shown in FIG. 3, the image reading apparatus 100 according to the present invention searches the manuscript 1 from lower left, upper left, and lower right corners in a direction toward a center to determine blank regions up to the content portion of the receipt of the image portion 2 as the margins 3 and searches the manuscript 1 from a lower right corner in a direction toward the center to determine a blank region up to the memo (for example, "2") of the image portion 2 as the margin 3. In this manner, the margin 3 is determined by searching for blank regions up to the image portion 2 from each corner of the manuscript 1 in a direction toward the center of the manuscript 1 at an oblique angle of, for example, 45 degrees.

If, as shown in FIG. 4, the determined margins 3 overlap because the size of region of the image portion 2 is small with respect to the manuscript 1, the image reading apparatus 100 according to the present invention classifies the determined margin 3 into margins 3-1 to 3-4 based on the position of each corner of the lower left, upper left, upper right and lower right. Thus, the image reading apparatus 100 according to the present invention may acquire positional information of the mark 4 by determining in which region among the classified margins 3-1 to 3-4 the mark 4 is written.

Referring back to FIG. 1, the image reading apparatus 100 according to the present invention detects at least one mark 4 matching a characteristic information of the mark 4 from the margin 3 of the manuscript 1 read by the image reader 116 to acquire the characteristic information of the detected mark 4 (step SA-2).

The mark 4 may be written by hand by a user.

Referring to FIGS. 5 to 7, one example of the characteristic information of the mark 4 on the manuscript 1 is explained below. As shown in FIGS. 5 to 7, the mark 4 on the manuscript 1 is constituted by a long side 5 and a short side 6 being combined (for example, a check mark). The characteristic information of the mark 4 includes information about at least an angle of the long side 5 with the short side 6 of the mark 4 and an orientation of the mark 4.

As shown in FIGS. 5 to 7, characteristic information of the mark 4 is registered with the image reading apparatus 100 according to the present invention in advance. Then, the image reading apparatus 100 according to the present invention detects at least one mark 4 matching characteristic information of the mark 4 registered in advance from the margin 3 of the manuscript 1. That is, the image reading apparatus 100 according to the present invention classifies and detects the shape of the mark 4 based on characteristic information including orientations and angles of the long side 5 and the short side 6 constituting the mark 4 (for example, the angle of the long side 5 with the short side 6 is 90 degrees or more, or less than 90 degrees).

More specifically, as shown in FIG. 5, for example, the mark 4 has the short side 6 on the left side when viewed from the front direction and the long side 5 on the right side, and the mark 4 is oriented upward. The mark 4 also has the long side 5 within 180 degrees clockwise from the short side 6 and the angle of the long side 5 with the short side 6 is less than 90 degrees (acute angle).

Also, as shown in FIG. 6, for example, the mark 4 has the short side 6 on the left side when viewed from the front direction and the long side 5 on the right side, and the mark 4 is oriented downward. The mark 4 also has the long side 5 within 180 degrees counterclockwise from the short side 6 and the angle of the long side 5 with the short side 6 is more than 90 degrees (obtuse angle).

Also, as shown in FIG. 7, for example, the mark 4 has the long side 5 on the left side when viewed from the front direction and the short side 6 on the right side, and the mark 4 is oriented downward. The mark 4 also has the long side 5 within 180 degrees clockwise from the short side 6 and the angle of the long side 5 with the short side 6 is less than 90 degrees (acute angle).

In this manner, the image reading apparatus 100 according to the present invention lowers the possibility that a memo or noise (such as a straight line) of a read image not intended to be detected as the mark 4 is detected as the mark 4, acquires characteristic information of the shape of the mark 4 based on the long side 5 and the short side 6 of the mark 4, and decides processing specified by a predetermined command for the manuscript 1 based on the acquired characteristic information of the shape of the mark 4 by detecting the long side 5 and the short side 6 of the mark 4. The present embodiment explains an example, in which a check mark is used as the mark 4 of the present invention, but the present invention is not limited to this and the number of classifications of the mark 4 to be used may be increased by using vector recognition such as the generally used Hough conversion.

Referring back to FIG. 1 again, the image reading apparatus 100 according to the present invention detects coordinates of the mark 4 acquired in the manuscript 1 to determine the positional information corresponding to the detected coordinates (step SA-3).

The positional information may include at least one of three pieces of information showing a position of the mark 4 that is on 1) front side or back side, 2) upper side or lower side, or 3) left side or right side in the manuscript 1.

FIG. 1 shows, for example, an example in which the mark 4 is written at the lower left position of the margin 3 of the manuscript 1, but the mark 4 may be written at any position of the margin 3.

If, in FIG. 4, for example, the mark 4 is detected with coordinates in the region of the margin 3-1, the image reading apparatus 100 may determine the positional information as (front, left, upper and the like), if the mark 4 is detected with coordinates in the region of the margin 3-2, the positional information as (front, right, upper), if the mark 4 is detected with coordinates in the region of the margin 3-3, the positional information as (front, right, lower and the like), and if the mark 4 is detected with coordinates in the region of the margin 3-4, the positional information as (front, left, lower and the like).

Referring back to FIG. 1 again, the image reading apparatus 100 according to the present invention searches the command dictionary table 106*a* for the command associated with the characteristic information acquired and the positional information determined using the characteristic information and the positional information as search keys (step SA-4).

The storage unit of the image reading apparatus 100 according to the present invention associates and stores characteristic information of the predetermined mark 4 shape written in at least a portion of the margin 3 of the manuscript 1, positional information of the mark 4, and a command specifying processing on the manuscript 1 as the command dictionary table 106*a*. Here, a "command" is an instruction to cause the image reading apparatus 100 to perform processing specified by the user and is a concept including, in addition to programs, macros, and tools for performing the processing, instructions (file names, execution parameters and the like) to activate such programs, macros, and tools. For example, the command includes 1) a storage command for storing a specified image in a specified storage destination (for example, movement, copying, and integration), 2) an image processing command for performing image processing on a specified image (for example, deletion processing of the mark 4, binary conversion, and projective transformation), 3) an operation command for performing various operations such as conversion, compression and the like of a specified image in specified form (for example, JPEG conversion, GIF conversion, and ZIP format compression), and 4) other commands (for example, classification of processing).

Then, the image reading apparatus 100 according to the present invention executes the processing specified for the command searched for on the manuscript 1 (step SA-5).

Here, the image reading apparatus 100 according to the present invention may perform image processing so that the mark 4 written in at least a portion of the margin 3 of the manuscript 1 is deleted from the margin 3 of the manuscript 1 after processing on the manuscript 1 is performed.

Configuration of Image Reading Apparatus 100

Figure 8:
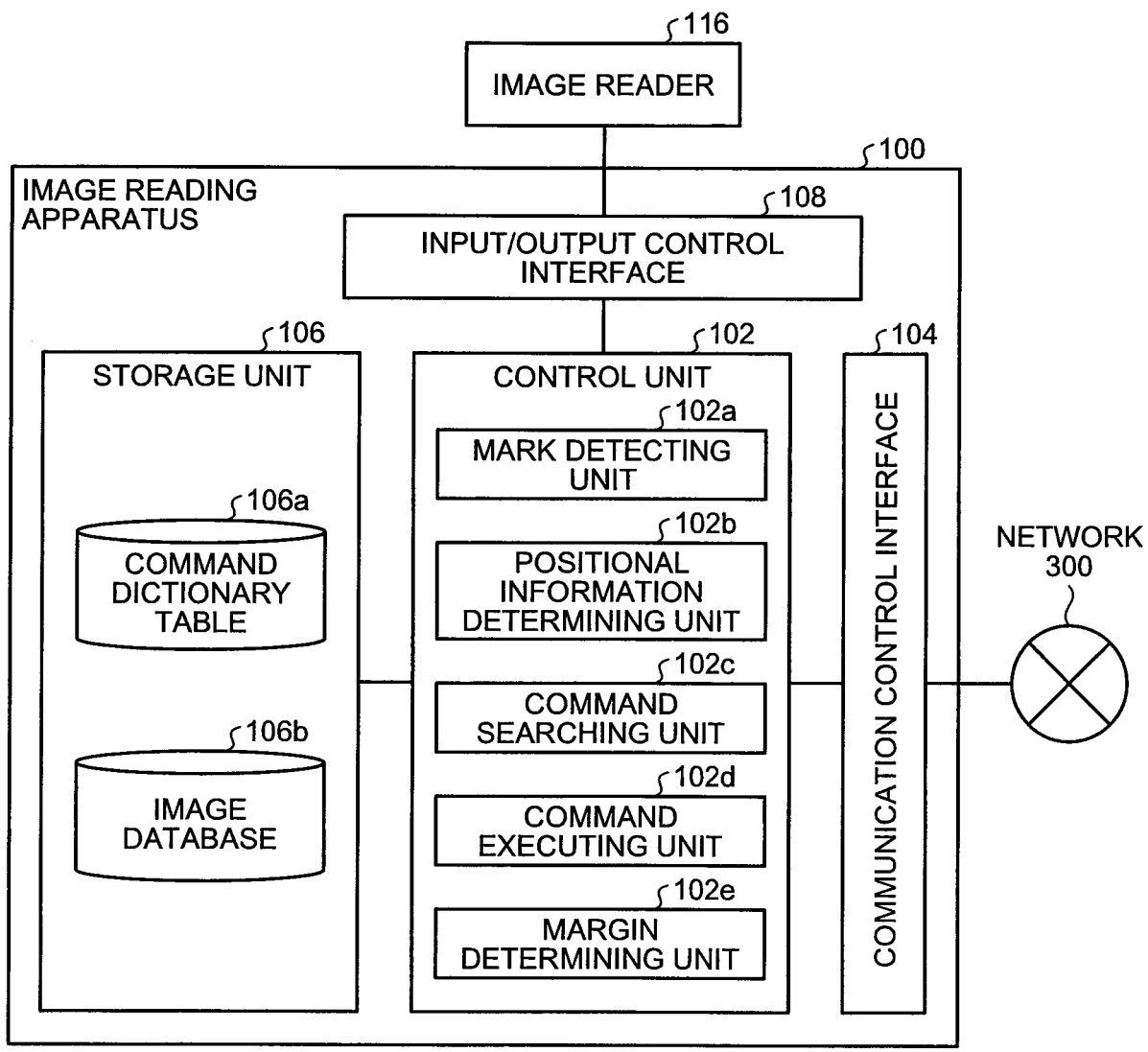
FIG. 8 is a block diagram showing one example of a configuration of the image reading apparatus 100 according to the embodiment.

Referring to FIGS. 8 and 9, configuration of an image reading apparatus 100 will be explained. FIG. 8 is a block diagram showing one example of a configuration of the image reading apparatus 100 according to the embodiment, and conceptually shows only parts related to the present invention. FIG. 9 is a chart showing one example of a configuration of a command dictionary table 106*a* according to the embodiment.

In FIG. 8, in general, the image reading apparatus 100 is provided with a control unit 102, a communication control interface 104, an input/output control interface 108, a storage unit 106, and the image reader 116. Here, the control unit 102 is a central processing unit (CPU) or the like that integrally controls the image reading apparatus 100. The storage unit 106 is a device that stores various databases and tables. The input/output control interface 108 is an interface connected to an input unit (not shown), an output unit (not shown), and the image reader 116. The input/output control interface 108 controls the input unit, the output unit, and the image reader 116. The output unit may be a monitor (including a household-use TV), a speaker, and the like, and the input unit may be a keyboard, a mouse, a microphone, and the like. The communication control interface 104 is an interface that connects to a communication device (not shown) such as a router connected to a communication channel or the like. The units composing the image reading apparatus 100 are communicatably connected through an optional communication channel. Further, the image reading apparatus 100 may be communicatably connected to a network 300 via a communication device such as a router, and a wired or wireless communication line such as a dedicated line.

The various databases and tables (such as the command dictionary table 106*a* and an image database 106*b*) stored in the storage unit 106 are storage units such as fixed disk devices. For example, the storage unit 106 stores various programs, various tables, various databases, and the like used in various processes.

Among components of the storage unit 106, the command dictionary table 106*a* is a command storage unit for associating and storing characteristic information of the shape of the predetermined mark 4 written in at least a portion of the margin 3 of the manuscript 1 detected by the image reader 116, positional information of the mark 4, and a command specifying processing on the manuscript 1 registered by the user in advance via an input unit (not shown). FIG. 9 is a chart showing one example of a configuration of the command dictionary table 106*a* according to the embodiment.

As shown in FIG. 9, characteristic information of the shape of the predetermined mark 4 stored in the command dictionary table 106*a* is information or the like used for classification of characteristics of the shape of the mark 4 and, for example, the angle of the long side 5 with the short side 6 of the mark 4 (for example, the obtuse angle if the angle is equal to or more than 90 degrees and the acute angle if the angle is less than 90 degrees) and information about the orientation of the mark 4 (for example, the orientation of the mark 4 based on whether the long side 5 is within 180 degrees clockwise (or counterclockwise) from the short side 6, the orientation of the mark 4 based on in which direction of up/down/left/right the angle of the long side 5 is oriented with respect to the short side 6).

Positional information of the mark 4 stored in the command dictionary table 106*a* is information or the like showing the position of the mark 4 in the manuscript 1 and, for example, information showing the position such as front/back, upper/lower, and right/left of the mark 4 in the manuscript 1 based on coordinates of the mark 4 detected by the control unit 102.

Commands (for example, processing A1 to processing D1) stored in the command dictionary table 106*a* are commands or the like that invoke programs or the like specifying processing on the manuscript 1 performed by the control unit 102 and, for example, commands specifying processing to store an image of the manuscript 1 read by the image reader 116 in a specified storage destination (for example, movement, copying, and integration of a file), image processing on an image of the manuscript 1 (for example, deletion processing of the mark 4, binary conversion, and projective transformation), and processing to compress a file in a specified file storage format (for example, JPEG conversion, GIF conversion, and ZIP format compression).

Returning to FIG. 8, the image database 106*b* is an image storing unit for storing various dynamic images and still images and, if a scanner device or the like is used as the image reader 116, for example, still images of the manuscript 1 of a document like a slip or photo may be stored and, if a digital camera, Web camera or the like is used as the image reader 116, dynamic images or still images of a photographing target may be stored. The image database 106*b* may also store dynamic images or still images obtained after various kinds of image processing (for example, projective transformation and cropping) are performed by the control unit 102 on images (including dynamic images and still images) read by the image reader 116.

In FIG. 8, the control unit 102 includes an internal memory that stores a control program such as an operating system (OS), programs specifying various processing procedures, and necessary data and performs information processing for executing various pieces of processing by using these programs. The control unit 102 functionally and conceptually includes a mark detecting unit 102*a*, a positional information determining unit 102*b*, a command searching unit 102*c*, a command executing unit 102*d*, and a margin determining unit 102*e*.

The mark detecting unit 102*a* is a mark detecting unit that detects at least one mark 4 matching the characteristic information of the mark 4 from the margin 3 of the manuscript 1 read by the image reader 116 to acquire the characteristic information of the detected mark 4. The mark detecting unit 102*a* may detect at least one mark 4 matching the characteristic information of the mark 4 from the margin 3 of the manuscript 1 determined by the margin determining unit 102*e*.

Here, the image reader 116 is a scanner device or the like having a function to read the manuscript 1 and may be, for example, a digital multifunction product having functions of a copier, scanner, printer, facsimile and the like. The image reader 116 may also be, for example, a digital camera, Web camera and the like having a function to acquire dynamic images or still images of a photographing target.

The positional information determining unit 102*b* is a positional information determining unit that detects coordinates of the mark 4 acquired by the mark detecting unit 102*a* in the manuscript 1 to determine the positional information corresponding to the detected coordinates.

The command searching unit 102*c* is a command searching unit that searches the command dictionary table 106*a* for the command associated with the characteristic information acquired by the mark detecting unit 102*a* and the positional information determined by the positional information determining unit 102*b* using the characteristic information and the positional information as search keys.

The command executing unit 102*d* is a command executing unit that executes the processing specified for the command searched for by the command searching unit 102*c* on the manuscript 1, and stores an image of the manuscript 1 in the image database 106*b*. The command executing unit 102*d* may perform image processing so that the mark 4 written in at least a portion of the margin 3 of the manuscript 1 is deleted from the margin 3 of the manuscript 1 after processing on the manuscript 1 is performed, and store an image of the manuscript 1 in which the mark 4 is deleted, in the image database 106*b*.

The margin determining unit 102*e* is a margin determining unit that detects corners of the manuscript 1 and searches a region from the detected corners to an image portion 2 of the manuscript 1 in a direction toward a center of the manuscript 1 to determine the margin 3.

Processing of Image Reading Apparatus 100

One example of a processing of the image reading apparatus 100 according to the embodiment will be explained in detail with reference to FIG. 10. FIG. 10 is a flowchart showing details of a processing of the image reading apparatus 100 according to the embodiment.

First, details of processing including mark detection processing of the image reading apparatus 100 will be explained with reference to FIG. 10. In the processing below, for example, an example of using the manuscript 1 on which the mark 4 is written at the lower left position in the margin 3, as shown in FIG. 1, will be explained.

As shown in FIG. 10, the user sets the manuscript 1 (such as a document like a slip) to a feeding unit of the image reader 116 (such as a scanner) (step SB-1). Here, if the image reader 116 is an ADF type scanner, the user may set a plurality of the manuscripts 1 to the feeding unit of the image reader 116 so that continuous reading processing is performed. The user may also write the predetermined mark 4 (for example, a check mark) by hand at any position (for example, the lower left position) in the margin 3 of the manuscript 1.

The control unit 102 reads the manuscript 1 by controlling the image reader 116 (step SB-2).

The control unit 102 recognizes an image including the manuscript 1 read by the image reader 116 and a background (step SB-3).

The margin determining unit 102*e* detects a boundary (outer edge line of the manuscript 1) between the manuscript 1 and a background in an image including the manuscript 1 read by the image reader 116 and the background based on luminance or the like and detects corners of the manuscripts 1 (four corners of the manuscripts 1) by performing cropping processing of cutting out the manuscript 1 from the background (step SB-4). Then, the margin determining unit 102*e* determines the margin 3 by searching a region from each detected corner (four corners (upper left, upper right, lower right, and lower left) of the manuscript 1) of the manuscript 1 to the image portion 2 (a portion including the title such as Receipt and a content portion) of the manuscript 1 in a direction toward the center at an oblique angle of 45 degrees or the like and classifies the margin 3 into the margins 3-1 to 3-4 based on the position of each corner of the lower left, upper left, upper right, and lower right of the manuscript 1 respectively. Then, the mark detecting unit 102*a* extracts a mark region (not shown) in the margin 3 in which the mark 4 is written from the margins 3-1 to 3-4 of the manuscript 1 read by the image reader 116.

After processing at step SB-4, the mark detecting unit 102*a* extracts characteristics of the long side 5 and short side 6 of the mark 4 (for example, a check mark) constituted by the long side 5 and short side 6 being combined from the extracted mark region (step SB-5). More specifically, the mark detecting unit 102*a* acquires the angle of the long side 5 with the short side 6 of the mark 4 (for example, the obtuse angle if the angle of the long side 5 with the short side 6 is equal to or more than 90 degrees and the acute angle if the angle is less than 90 degrees) and information about the orientation of the mark 4 (for example, the orientation of the mark 4 based on whether the long side 5 is within 180 degrees clockwise (or counterclockwise) from the short side 6, the orientation of the mark 4 based on in which direction of up/down/left/right the angle of the long side 5 is oriented with respect to the short side 6) as characteristic information of the shape of the mark 4. Then, the mark detecting unit 102*a* detects at least one mark 4 registered in advance matching characteristic information of the acquired mark 4. That is, the mark detecting unit 102*a* classifies and detects the shape of the mark 4 based on characteristic information (for example, upward, acute angle, clockwise) including the orientation and angle of the long side 5 and the short side 6 constituting the mark 4.

Here, the mark 4 written in the margin 3 of the manuscript 1 in the present embodiment has, as shown in FIG. 5, the short side 6 on the left side and the long side 5 on the right side when viewed from the front and the orientation of the mark 4 is upward. The mark 4 also has the long side 5 within 180 degrees clockwise from the short side 6 and the angle of the long side 5 with the short side 6 is less than 90 degrees (acute angle).

Then, the command searching unit 102*c* searches the command dictionary table 106*a* for commands (for example, processing A1 to processing A4) associated with characteristic information (for example, upward, acute angle, clockwise) using the characteristic information of the shape of the mark 4 acquired by processing of the mark detecting unit 102*a* as search keys (step SB-6).

If, for example, the command corresponding to characteristic information of the mark 4 is the above image processing command, presence/absence of deletion processing (for example, acute angle: deleted, obtuse angle: no deletion) may be specified to the angle of the long side 5 with the short side 6 of the mark 4. If the command corresponding to characteristic information of the mark 4 is the above operation command, presence/absence of compression (for example, clockwise: compressed, counterclockwise: no compression) or the storage format of a file (upward: BMP, downward: JPEG, leftward: GIF, rightward: PNG and the like) may be specified to information about the orientation of the mark 4.

Returning to after processing at step SB-4, the positional information determining unit 102*b* determines, among the margins 3-1 to 3-4 classified by processing of the margin determining unit 102*e*, in a region of which of the margins the mark region in which the mark 4 is written is located as the positional analysis of the mark 4 and, if the mark 4 is detected as coordinates in a region of the margin 3-1, determines positional information (for example, front, left, upper) (step SB-7). The positional information determining unit 102*b* may also detect coordinates of the mark 4 in the manuscript 1 from the mark region extracted by processing of the mark detecting unit 102*a* to determine positional information (for example, front, left, upper) corresponding to the detected coordinates.

The command searching unit 102*c* searches the command dictionary table 106*a* for commands (for example, processing A2, processing B2, processing C2) associated with positional information (for example, front, left, and upper) using the positional information determined by processing of the positional information determining unit 102*b* as search keys (step SB-8).

If, for example, the command corresponding to positional information of the mark 4 is the above storage command, the storage destination (for example, upper left: bill folder, upper right: order folder, lower left: receipt folder, lower right: others) may be specified to the front of the manuscript 1. If the command is the above other command, for example, a command showing the processing classification (upper left: exception handling, upper right: emergency processing, lower left: approval processing, lower right: normal processing and the like) may be specified to the back of the manuscript 1.

Then, the command searching unit 102*c* determines a common command (for example, processing A2) from commands (for example, processing A1 to processing A4) searched using characteristic information (for example, upward, acute angle, clockwise) as search keys at step SB-6 and commands (for example, processing A2, processing B2, processing C2) searched using positional information (for example, front, left, and upper) as search keys at step SB-8 as a processing flow for the manuscript 1 (step SB-9).

That is, the command searching unit 102*c* searches the command dictionary table 106*a* for a command (for example, processing A2) associated with characteristic information and positional information using the characteristic information (for example, upward, acute angle, clockwise) acquired by processing of the mark detecting unit 102*a* and the positional information (for example, front, left, and upper) determined by processing of the positional information determining unit 102*b* as search keys.

For example, the processing A2 may be a command that performs processing in which "deletion processing of the mark 4 written in the manuscript 1 is not performed (acute angle: no deletion) and compression (clockwise: compressed) is performed in BMP format (upward: BMP) before storage in the bill folder (front upper left: bill folder) of the image database 106*b*".

Then, the command executing unit 102*d* performs processing (for example, processing that does not perform deletion processing of the mark 4 written in the manuscript 1 and performs compression in BMP format before storage of an image in the bill folder of the image database 106*b*) specified by the command (for example, processing A2) searched by processing of the command searching unit 102*c* on the manuscript 1 and stores an image of the manuscript 1 compressed in BMP format in the bill folder of the image database 106*b*.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the image reading apparatus 100 performs various processes as a stand-alone device. However, the image reading apparatus 100 can be configured to perform processes in response to request from a client terminal, which is a separate unit, and return the process results to the client terminal.

An example of using a scanner or the like as the image reader 116 is explained above, but digital camera or WEB camera which can take images of the manuscript 1 and the like of a photographing target may be used as the image reader 116.

An example of the image reading apparatus 100 determining and executing a processing on the manuscript 1 read by the image reader 116 which separates from the image reading apparatus 100, is explained above, but the image reader 116 may be integrated into the image reading apparatus 100. For example, the image reading apparatus 100 may be provided with the image reader 116 that is digital camera or the like provided with a charge coupled device (CCD).

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image reading apparatus 100 are merely conceptual and may not necessarily physically resemble the structures shown in the drawings.

For example, the process functions performed by each device of the image reading apparatus 100, especially the each process function performed by the control unit 102, can be entirely or partially realized by CPU and a computer program executed by the CPU or by a hardware using wired logic. The computer program, recorded on a recording medium to be described later, can be mechanically read by the image reading apparatus 100 as the situation demands. In other words, the storage unit 106 such as read-only memory (ROM) or hard disk (HD) stores the computer program that can work in coordination with an operating system (OS) to issue commands to the CPU and cause the CPU to perform various processes. The computer program is first loaded to the random access memory (RAM), and forms the control unit 102 in collaboration with the CPU.

Alternatively, the computer program can be stored in any application program server connected to the image reading apparatus 100 via the network 300, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over the network 300 such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106 is a fixed disk device such as RAM, ROM, and HD or flexible disk, optical disk, and stores therein various programs, tables, databases (such as the command dictionary table 106a and the image database 106b), and files required for various processes.

The image reading apparatus 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, an effect of being able to write a mark specifying processing for any manuscript 1, and to automatically determine and perform processing specified by a command predetermined for the manuscript 1 based on characteristics of the shape of the mark 4 and the position where the mark 4 is written is achieved. The present invention also achieves an effect of being able to combine and perform processing specified by a plurality of commands by writing a plurality of marks 4 in the margin 3 of the manuscript 1.

According to the present invention, a region of the margin 3 can appropriately be determined even if manuscripts 1 have various forms of different sizes and positions of the image portion in the manuscript 1. Therefore, the present invention achieves an effect of being able to improve mark detection accuracy by appropriately determining the margin 3, to write the mark 4 to specify processing on the manuscript 1 in any format in any position of the margin 3, and further to automatically determine and perform processing specified by a command predetermined for the manuscript 1 based on characteristics of the shape of the mark 4 and the position where the mark 4 is written.

According to the present invention, an effect of being able to prevent writings (such as a line) in the manuscript 1 from being misrecognized as the mark 4 is achieved. The present invention achieves an effect of being able to associate a command specifying processing on the manuscript 1 by using information about the angle of the long side 5 with the short side 6 of the mark 4 and the orientation of the mark 4 as classification keys and to store various processing commands. The present invention also achieves an effect of being able to combine and perform processing based on a plurality of pieces of characteristic information by writing a plurality of marks 4 in the margin 3 of the manuscript 1 with changed angles or orientations. Therefore, the present invention achieves an effect of being able to improve mark detection accuracy, reduce the mark reading processing load, and shorten the mark reading processing time by using simple marks, and further to automatically determine and perform processing specified by a command predetermined on the manuscript 1 based on characteristics of the shape of the mark 4 in simple form described in the margin 3 of the manuscript 1.

According to the present invention, up to eight classification keys can be held as positional information by using, for example, four corners each for the front and back as the margins 3 of the manuscript 1. That is, the present invention achieves an effect of being able to associate a command specifying processing on the manuscript 1 by using the position of at least one mark 4 of 1) front or back, 2) upper or lower, and 3) right or left as a classification key and to store various processing commands. In addition, the present invention can change processing content on the manuscript 1 depending on the position where the mark 4 is written even if the mark 4 has the same shape and achieves an effect of being able to combine and perform processing based on a plurality of marks 4 written at a plurality of positions.

According to the present invention, for example, immediately before the manuscript 1 such as a slip is read, the user can easily specify processing such as designation of a classification destination by handwriting while checking content of the slip such as where the slip is received from. That is, the present invention achieves an effect of being able to easily change processing on the manuscript 1 by the mark 4 being written by hand in the margin 3 by the user without using an input unit (such as a mouse) even if, for example, a plurality of manuscripts 1 such as slips immediately before being read is piled up in the image reader 116.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
   an image reader configured to read a manuscript with a margin on at least a portion thereof, the margin including a mark having a long side and a short side making an oblique angle therebetween on at least a portion thereof;
   a storage unit including a command storage unit configured to store therein characteristic information of the mark including at least information about the angle of the long side with respect to the short side of the mark and information about an orientation of the mark, positional information of the mark, and a command specifying a processing on the manuscript in an associated manner; and
   a control unit includes: including
      a margin determining unit configured to detect a corner of the manuscript and search a region from the detected corner to an image portion of the manuscript in a direction toward a center of the manuscript to determine the margin of the manuscript read by the image reader,
      a mark detecting unit configured to detect at least one mark matching the characteristic information of the mark from the determined margin of the manuscript determined by the margin determining unit and acquire the characteristic information of the detected mark,
      a positional information determining unit configured to detect coordinates of the detected mark on the manuscript and determine the positional information of the detected mark from the detected coordinates,
      a command searching unit configured to search the command storage unit for a command associated with the acquired characteristic information acquired by the mark detecting unit and the determined positional information determined by the positional information determining unit using the acquired characteristic information and the determined positional information as search keys, and
      a command executing unit the configured to execute a processing specified by the searched command searched by the command searching unit on the manuscript, and
   the mark includes a hand-written mark.

2. The image reading apparatus according to claim 1, wherein the positional information includes information indicating a position of the mark on at least one of (i) a front side or a back side, (ii) an upper side or a lower side, or (iii) a left side or a right side in the manuscript.

3. The image reading apparatus according to claim 1, wherein the mark includes a mark identified by a vector recognition.

4. The image reading apparatus according to claim 3, wherein the mark includes a check mark.

5. The image reading apparatus according to claim 1, wherein the processing includes any one of
   an image storing processing for storing a specified image in a specified storage,
   an image processing for performing a predetermined image processing on a specified image, or
   an image handling processing for converting a specified image in a specified form.

6. A mark detection method executed by an image reading apparatus including:
   an image reader configured to read a manuscript with a margin on at least a portion thereof, the margin including a mark having a long side and a short side making an oblique angle therebetween on at least a portion thereof;
   a storage unit including a command storage unit configured to store therein characteristic information of the mark including at least information about the angle of the long side with respect to the short side of the mark and information about an orientation of the mark, positional information of the mark, and a command specifying a processing on the manuscript in an associated manner, and
   a control unit,
   the mark detection method comprising:
      a margin determining step of detecting a corner of the manuscript and searching a region from the detected corner to an image portion of the manuscript in a direction toward a center of the manuscript to determine the margin of the manuscript read by the image reader;
      a mark detecting step of detecting at least one mark matching the characteristic information of the mark from the determined margin of the manuscript determined at the margin determining step and acquiring the characteristic information of the detected mark;
      a positional information determining step of detecting coordinates of the detected mark on the manuscript and determining the positional information of the detected mark from the detected coordinates;
      a command searching step of searching the command storage unit for a command associated with the acquired characteristic information acquired at the mark detecting step and the determined positional information determined at the positional information determining step using the acquired characteristic information and the determined positional information as search keys; and
      a command executing step of executing the processing specified by the searched command searched at the command searching step on the manuscript,
   wherein the steps are executed by the control unit, and
   wherein the mark includes a hand-written mark.

7. The mark detection method according to claim 6, wherein the positional information includes information indicating a position of the mark on at least one of (i) a front side or a back side, (ii) an upper side or a lower side, or (iii) a left side or a right side in the manuscript.

8. The mark detection method according to claim 6, wherein the mark includes a mark identified by a vector recognition.

9. The mark detection method according to claim 8, wherein the mark includes a check mark.

10. The mark detection method according to claim 6, wherein the processing includes any one of
- an image storing processing for storing a specified image in a specified storage,
- an image processing for performing a predetermined image processing on a specified image, or
- an image handling processing for converting a specified image in a specified form.

* * * * *